US010615833B2

(12) United States Patent
Lin

(10) Patent No.: US 10,615,833 B2
(45) Date of Patent: Apr. 7, 2020

(54) OPTIMIZED DEMODULATION OF RDS SIGNALS IN DIGITAL RADIO

(71) Applicants: Continental Automotive France, Toulouse (FR); Continental Automotive GmbH, Hannover (DE)

(72) Inventor: Chao Lin, Maurepas (FR)

(73) Assignees: Continental Automotive France, Toulouse (FR); Continental Automotive GmbH, Hannover (DE)

(*) Notice: Subject to any disclaimer, the term of this patent is extended or adjusted under 35 U.S.C. 154(b) by 0 days.

(21) Appl. No.: 16/340,162

(22) PCT Filed: Nov. 23, 2017

(86) PCT No.: PCT/FR2017/053236
§ 371 (c)(1),
(2) Date: Apr. 8, 2019

(87) PCT Pub. No.: WO2018/096284
PCT Pub. Date: May 31, 2018

(65) Prior Publication Data
US 2019/0245571 A1    Aug. 8, 2019

(30) Foreign Application Priority Data
Nov. 24, 2016 (FR) ..................................... 16 61473

(51) Int. Cl.
*H04B 1/3822* (2015.01)
*H04B 1/38* (2015.01)
*H04W 4/48* (2018.01)
*H04B 1/00* (2006.01)
*H04B 1/712* (2011.01)
(Continued)

(52) U.S. Cl.
CPC ......... *H04B 1/3822* (2013.01); *H04B 1/0042* (2013.01); *H04B 1/38* (2013.01); *H04B 1/712* (2013.01); *H04W 4/48* (2018.02)

(58) Field of Classification Search
CPC .... H04B 1/0042; H04B 1/3822; H04B 1/712; H04B 1/00; H04B 1/005; H04B 1/0039;
(Continued)

(56) References Cited

U.S. PATENT DOCUMENTS 5,495,203 A * 2/1996 Harp et al. .................... 329/306
5,572,553 A * 11/1996 Kimiavi et al. ............... 375/344
(Continued)

FOREIGN PATENT DOCUMENTS

FR          2792140 A1    10/2000

OTHER PUBLICATIONS

International Search Report and Written Opinion for International Application No. PCT/FR2017/053236, dated Mar. 13, 2018—8 pages.

*Primary Examiner* — Meless N Zewdu
(74) *Attorney, Agent, or Firm* — RatnerPrestia

(57) ABSTRACT

A method for correcting RDS demodulation in a vehicle radio system including a digital core with an RDS demodulation block, a numerically controlled oscillator, a digital mixer that mixes the input signals with the output of the numerically controlled oscillator, a low-pass filter for recovering baseband RDS signals including a sequence of symbols, and a phase-estimating block configured to estimate a phase deviation of the baseband signal. The method including a first correction acting, depending on the estimation of the phase deviation of the baseband signal, on a phase equalizer, downstream of the low-pass filter, in order to cancel out the phase deviation, and optionally a second correction forming a feedback loop and acting on the numerically controlled oscillator depending on the drift in the phase deviations of the baseband signal.

11 Claims, 3 Drawing Sheets

(58) Field of Classification Search
CPC ...... H04B 1/403; H04B 1/408; H04B 1/7075; H04B 3/146; H04B 7/0413; H04B 7/0417; H04B 7/08; H04B 10/60; H04B 15/06; H04B 17/20; H04B 17/309; H04B 1/3827; H04B 10/63; H04B 1/06; H04B 1/082; H04B 1/086; H04B 1/38; H04W 4/48; H04W 56/0035; H04W 56/009; H04W 56/0055; H04W 4/04; H04W 4/06; H04W 72/005; H04W 76/40; H04W 88/00; H04W 88/02; H04W 56/00; H04W 56/003; H04W 56/004; H04W 56/005; H04W 56/0095; H04W 28/04; H04M 1/6091; B60R 2325/103; B60R 2325/205

See application file for complete search history.

(56) References Cited

U.S. PATENT DOCUMENTS

| | | | |
|---|---|---|---|
| 5,684,832 A * | 11/1997 | Adachi et al. | 373/262 |
| 6,313,789 B1 * | 11/2001 | Zhodzishsky et al. | 342/357.12 |
| 6,459,888 B1 * | 10/2002 | Clark | 455/266 |
| 6,748,036 B1 * | 6/2004 | Tsurumaru | 375/344 |
| 6,865,175 B1 * | 3/2005 | Ritter | 370/345 |
| 7,587,170 B1 | 9/2009 | Lee et al. | |
| RE42,021 E * | 1/2011 | Pollmann et al. | 375/222 |
| 8,374,291 B1 * | 2/2013 | Himsoon et al. | 375/343 |
| 9,136,979 B2 * | 9/2015 | Kamiya et al. | H04L 1/0036 |
| 2002/0140515 A1 * | 10/2002 | Gierl et al. | 331/100 |
| 2003/0016767 A1 * | 1/2003 | Houtman | 373/326 |
| 2005/0058193 A1 * | 3/2005 | Saed | 375/232 |
| 2006/0039515 A1 * | 2/2006 | Lee et al. | 375/355 |
| 2006/0251190 A1 * | 11/2006 | Wang et al. | 373/330 |
| 2007/0047737 A1 * | 3/2007 | Lerner et al. | 381/22 |
| 2008/0219340 A1 * | 9/2008 | Saed | 375/231 |
| 2009/0141836 A1 * | 6/2009 | Shirakata et al. | 375/343 |
| 2009/0175385 A1 * | 7/2009 | Tsai et al. | 375/326 |
| 2013/0171936 A1 * | 7/2013 | Newton | 455/41.2 |
| 2013/0315346 A1 * | 11/2013 | Varma et al. | 375/316 |
| 2014/0140432 A1 * | 5/2014 | Weinholt et al. | H04L 27/38 |
| 2016/0330064 A1 * | 11/2016 | Kamiya et al. | H04L 27/3872 |

* cited by examiner

OPTIMIZED DEMODULATION OF RDS SIGNALS IN DIGITAL RADIO

CROSS REFERENCE TO RELATED APPLICATIONS

This application is the U.S. National Phase Application of PCT International Application No. PCT/FR2017/053236, filed Nov. 23, 2017, which claims priority to French Patent Application No. 1661473, filed Nov. 24, 2016, the contents of such applications incorporated by reference herein.

FIELD OF THE INVENTION

The present invention relates to vehicle radio systems for motor vehicles, in particular those configured to receive FM channels containing digital data in radio-data-system (RDS) format and that are encoded in a subcarrier.

BACKGROUND OF THE INVENTION

In practice, this subcarrier at 57 kHz is triple a reference frequency at 19 kHz, but it turns out that the observed precision in these frequencies is not optimal, in particular if the various emitters and the various receivers that are supposed to interact with one another are considered.

With this in mind, the receiver must have a mechanism for resetting carrier frequency, and phase if needs be, in order to be able to demodulate, under satisfactory conditions, the signals received via the antenna and to be able to deduce therefrom a so-called "baseband" signal that is exploitable with respect to so-called RDS information.

A feedback loop of the phase-locked-loop (PLL) type, developed in the historic context of purely analog radios is known to those skilled in the art.

This PLL solution has been adapted to the context of vehicle radios implementing digital processing, and is known as a "Costas loop".

However, it turns out that the implementation of this "Costas loop" adaptation is not optimal from the economic point of view in the context of use of "finite impulse response" (FIR) digital filters and of vector digital signal processors (DSPs).

SUMMARY OF THE INVENTION

The inventors have therefore identified a need to improve solutions for resetting the RDS carrier, phase included, in vehicle radio systems implementing digital processing.

To this end, a method for correcting RDS demodulation in a vehicle radio system is proposed here, this method comprising:
 a digital core with an RDS demodulation block,
 an input for digital signals,
 a numerically controlled oscillator that delivers a complex value,
 a complex digital mixer that mixes the input signals with the output of the numerically controlled oscillator,
 a low-pass filter for recovering baseband demodulated RDS signals comprising a sequence of complex symbols $S(k)$,
 a phase-estimating block configured to estimate a phase deviation $\hat{\theta}$ of the baseband signal,
 an RDS decoding block to which the filtered signals are transmitted,
 the method comprising a first correction acting, depending on the estimation of the phase deviation $\hat{\theta}$ of the baseband signal, on a phase equalizer, downstream of the passband filter, in order to cancel out the phase deviation.

By virtue of these provisions, phase is reset, this improving the reliability of the downstream decoding, even when a vector DSP and a relatively simple calculation are used. Thus, small phase deviations are corrected without it being necessary to alter the frequency of the numerically controlled oscillator.

In various embodiments of the system according to an aspect of the invention, recourse may furthermore potentially be made to any and/or all of the following provisions:

According to one preferred aspect, the phase-estimating block performs a calculation of phase deviation on the N last received symbols $S(k)$, N being an integer preferably comprised between 4 and 16, and more preferably equal to 8.

Specifically, phase is considered to vary little over these N last symbols. Advantageously, a calculation whereby the last received symbols are averaged thus allows aberrant values subsequent to electric interference that momentarily disrupted the received signal to be removed.

According to one particular aspect, the calculation of phase deviation $\hat{\theta}$ between the frequency of the numerically controlled oscillator 2 and the frequency of the emitter is estimated using the following formula:

$$\hat{\theta} = \frac{1}{2}\arg\left(\sum_{k=0}^{N-1}(S(k))^2\right) = \frac{1}{2}\arctan\left(\sum_{k=0}^{N-1}(S(k))^2\right)$$

Thus, a relatively simple calculation carried out on complex data representing the N last received symbols is used, independently of whether their phase is in the vicinity of 0° or in the vicinity of 180° (binary phase-shift keying (BPSK)), the power of two naturally "removing" phases of 180°; thus, the average phase deviation over these N last received symbols is determined.

According to one particular aspect, a conjugate $e^{-j\hat{\theta}}$ of the estimated phase deviation is calculated, which is injected into the phase equalizer, where it cancels out the phase deviation of the current symbol transmitted to the decoding block.

The conjugate $e^{-j\hat{\theta}}$ of the estimated phase deviation is calculated using the following formula:

$$e^{-j\hat{\theta}} = conj\left(\sqrt{\frac{\sum_{k=0}^{N-1}(S(k))^2}{\left\|\sum_{k=0}^{N-1}((Sk))^2\right\|}}\right)$$

Thus, a very simple conjugation calculation and a multiplication are all that is required to cancel out the phase deviation of the symbol transmitted to the decoding block.

According to one particular aspect, the method comprises a second correction forming a feedback loop and acting on the numerically controlled oscillator depending on the drift in the phase deviations of the baseband signal, in order to reset the frequency of the numerically controlled oscillator to as close as possible to the received RDS subcarrier.

Thus, for a more consequent phase drift, the potential "phase shift" problem is avoided if the 57 kHz subcarrier drift is rapid.

According to one particular aspect, the frequency of the numerically controlled oscillator is corrected only if the drift in the phase deviations is higher than a preset threshold. Advantageously, the numerically controlled oscillator is altered only if a significant drift is observed.

According to one particular aspect, the drift in the phase deviations is calculated from an average drift over M consecutive phase deviations, M being an integer.

Advantageously, a calculation whereby the drift observed over the last received symbols is averaged thus allows aberrant values subsequent to electric interference that momentarily disrupted the received signal to be removed.

According to one particular aspect, the second correction forming a feedback loop is undersampled with respect to the first correction. This makes it possible to guarantee a good stability for the subcarrier-frequency reset.

An aspect of the invention also relates to a vehicle radio system such as described above, that in particular contains a digital core with an RDS demodulation block, an input for digital signals, a numerically controlled oscillator, a digital mixer that mixes the input signals with the output of the numerically controlled oscillator, and a low-pass filter for recovering baseband RDS signals, comprising:
- a sequence of complex symbols,
- a phase-estimating block,
- a first correcting loop acting, depending on a measurement of the phase deviation of the baseband signal, on
- a phase equalizer, downstream of the passband filter.

According to one particular aspect, the system may furthermore comprise a second correction loop forming a feedback loop and acting on the numerically controlled oscillator depending on the drift in the phase deviations of the baseband signal, in order to reset the frequency of the numerically controlled oscillator to as close as possible to the received RDS subcarrier.

BRIEF DESCRIPTION OF THE DRAWINGS

Other features and advantages of aspects of the invention will become more apparent upon reading the description that will follow. This description is purely illustrative and should be read with reference to the appended drawings, in which.

DETAILED DESCRIPTION OF THE PREFERRED EMBODIMENTS

Embodiments of aspects of the invention are described below in their nonlimiting application. Aspects of the invention are not however limited to this example.

A vehicle radio system comprises an input for FM signals received by an input demodulator 9 that is not described in detail here because it is known per se. The demodulator 9 produces as output digital signals that are referenced FM MPX. The digital signals FM MPX are used for the audio channel as known per se and therefore not described in detail here.

The digital signals FM MPX are also used to decode so-called "RDS" signals conveyed by the RDS subcarrier at 57 kHz.

In the illustrated example, the stream of digital signals FM MPX contains complex symbols obtained at a frequency of 384 kHz, i.e. one symbol every 2.6 µs.

Figure 1:
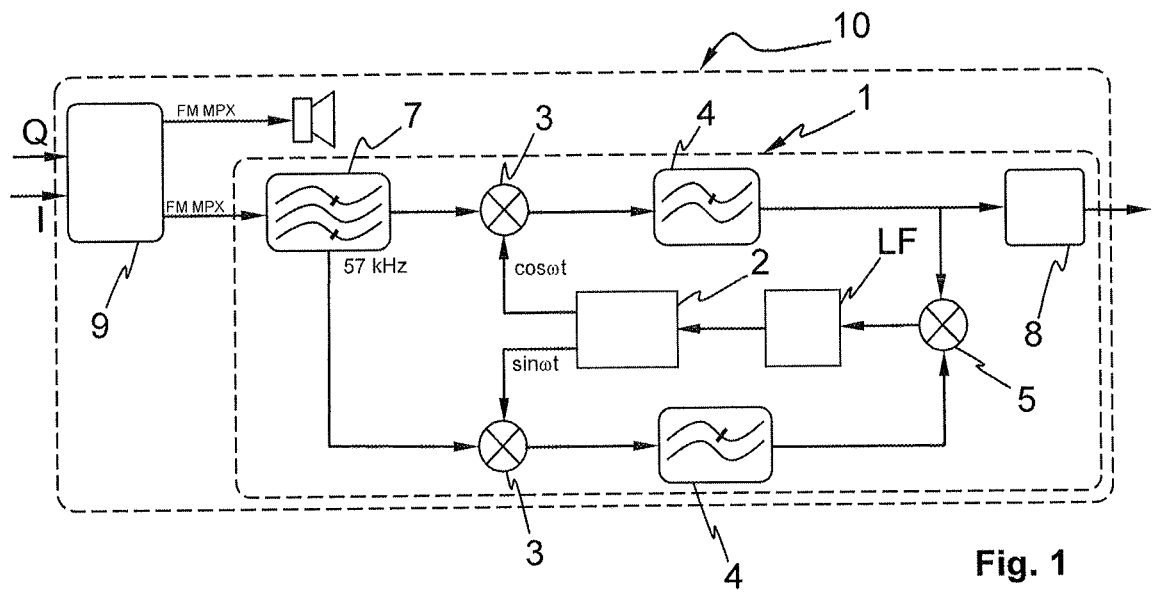
FIG. 1 illustrates a block diagram of RDS demodulation-decoding according to a conventional solution.

As illustrated in FIG. 1, an RDS demodulation-decoding block referenced 1, which comprises a low-pass filter 7, a numerically controlled oscillator 2 (also called an NCO), two complex digital mixers 3 that mix the input signals with the output of the numerically controlled oscillator 2 (branches referenced cos(ωt) and sin(ωt)), and their associated low-pass filters 4 for recovering the baseband demodulated RDS signals, which comprise a sequence of complex symbols S(k), is located downstream of the input of the digital signals FM MPX. Another digital mixer 5 mixes the two baseband demodulated branches to obtain the phase error between the numerically controlled oscillator 2 and the input signals. This error is then filtered by a loop filter LF to obtain the expected correction of the numerically controlled oscillator 2.

It will be noted that the numerically controlled oscillator 2 delivers an exponential complex value of the type $e^{j\omega t}$=cos ωt+j sin ωt and receives a scalar phase increment in order to obtain, by approximation, an exponential complex phase increment.

The RDS demodulation-decoding block 1 according to an aspect of the invention in addition comprises a phase equalizer 6 the function of which will be detailed below (see FIG. 3).

The decoding block 8, which generates binary data, in particular alphanumeric characters that are delivered to a display device (not shown in the figures) that serves to view the decoded RDS information, is located downstream.

Figure 2:
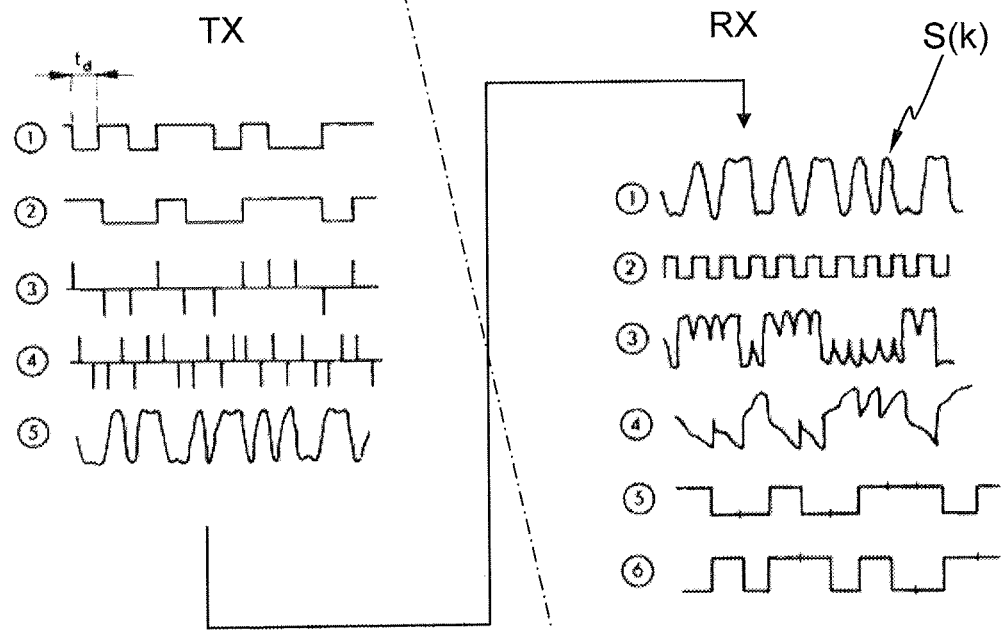
FIG. 2 illustrates examples of transmitted and received RDS signals.

Document EN 62 106, incorporated herein by reference, discusses key points with respect to the content of the data that transit the RDS channel, a synopsis of the transcoding used being illustrated in FIG. 2 for emitted signals, referenced TX, and received signals, referenced RX.

The baseband RDS signal is encoded using binary phase-shift keying (BPSK), namely a selective phase shift of 180°.

In fact, each bit is coded with a phase difference between a symbol and the proceeding symbol.

A phase difference of 180° is representative of a received bit of value 1.

A phase difference of 0° is representative of a received bit of value 0.

However, in practice, in the demodulator 9, the phase differences are never strictly 0° or 180°. A phase deviation, which is sometimes moderate and sometimes more consequent, is generally observed. This in particular depends on the stability and precision of the 57 kHz subcarrier of the emitter and of the subcarrier generated locally by the numerically controlled oscillator 2.

Advantageously, according to an aspect of the present invention, for each received baseband symbol S(k), the observed phase differences, namely the phase difference between the received signal and the signal received for the prior bit, are collected.

In the decoding 8, a small or zero phase difference will be converted into a binary value 0; conversely, a phase difference of 180° or similar will be converted into a binary value 1.

The function of the phase-estimating block 5 (see FIG. 3) is to estimate the phase deviation of the received symbol with respect to 0° or 180°. By convention, estimation of the phase of the received symbol, modulo 180°, for the purposes of resetting the phase in order to improve the downstream decoding, will more simply be spoken of.

Figure 3:
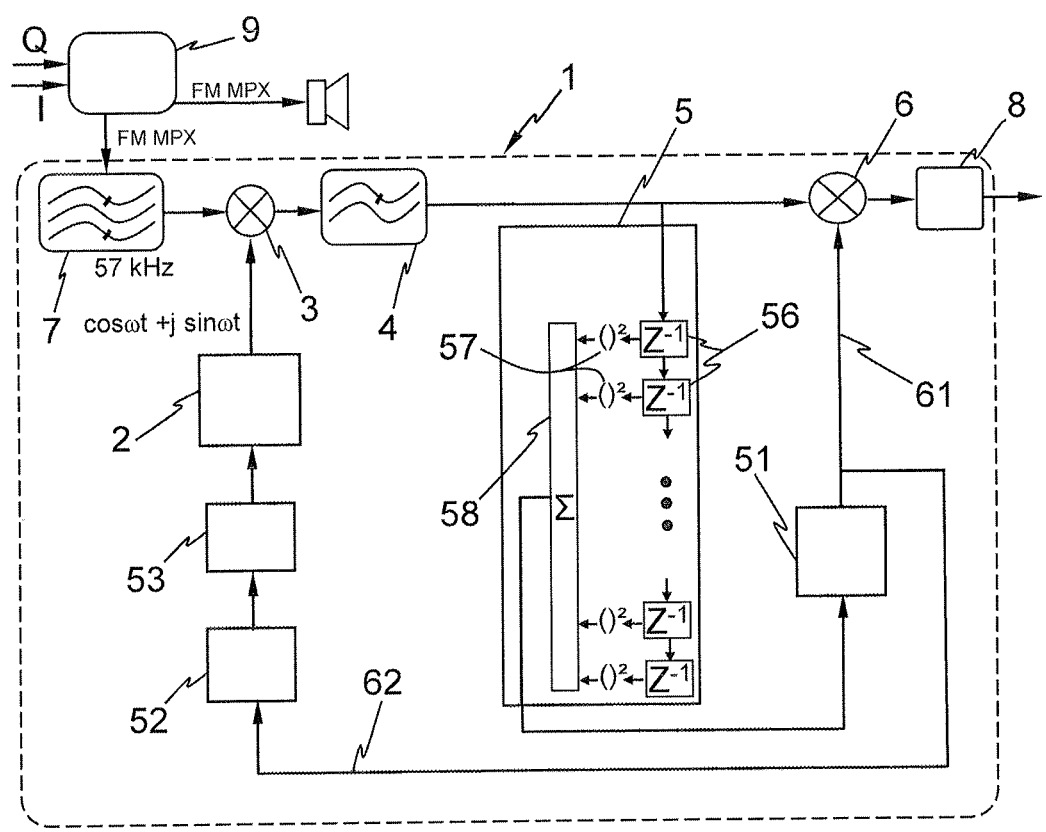
FIG. 3 illustrates a block diagram of RDS demodulation-decoding according to an aspect of the present invention.

In the example illustrated in FIG. 3, the phase-estimating block 5 performs a calculation of phase deviation on the N last received symbols S(k). N is an integer preferably chosen between 4 and 16. According to one preferred example, N may be chosen equal to 8.

In the example considered here, N=8 samples are considered with a sampling frequency of 384 kHz, this representing a time period (here of 20.8 μs) during which the phase of the signal does not vary and remains almost constant. Of course, the value of N could be different and be adapted to various sampling frequencies and various phase volatilities. To this end, the phase-estimating block 5 comprises delay cells 56 that allow over a depth N the signals S (k) received beforehand to be stored.

From these complex data in memory, the calculation of the estimation of the phase $\hat{\theta}$ of the signals output from the mixing stage is carried out using the following formula:

$$\hat{\theta} = \frac{1}{2}\arg\left(\sum_{k=0}^{N-1}(S(k))^2\right) = \frac{1}{2}\arctan\left(\sum_{k=0}^{N-1}(S(k))^2\right) \qquad \text{Eq. 1}$$

With a view to obtaining the sum of the squares of the symbols S(k), each symbol S(k) in memory is squared (reference 57 in FIG. 3), then all the squares are summed (block referenced 58). These operations are advantageously carried out in parallel by virtue of the use of a vector DSP (in the same central-processing-unit (CPU) cycles), the data being considered to be a vector.

The absence of recursivity will be noted, this making this vector-DSP approach particularly relevant.

Next, the argument of the obtained complex number (equivalent to the arctangent here for a complex number) is extracted, i.e. the average phase (modulo 180°) of the N symbols S (k) received beforehand.

Figure 5:
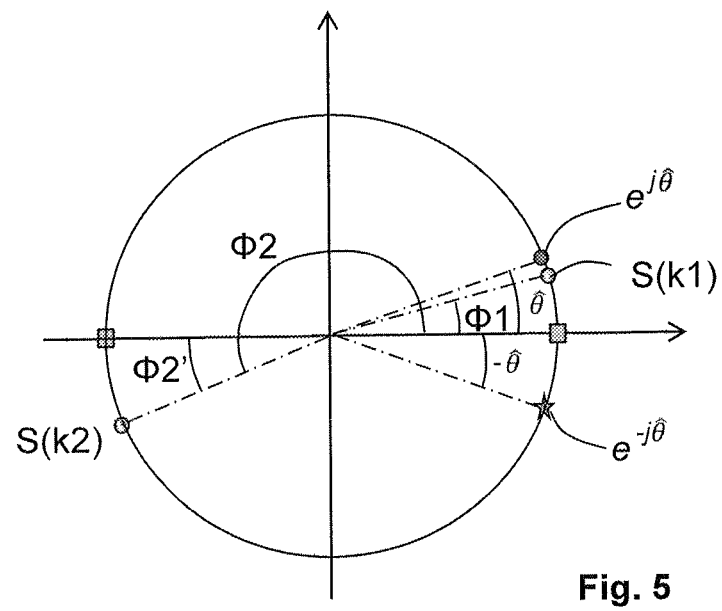
FIG. 5 illustrates an example of a moderate phase deviation compensated for by the phase equalizer.

More precisely, with reference to FIG. 5, the squaring operation serves to process in the same way symbols having a zero phase or a phase in the vicinity of zero (example S(k1)) and symbols having a phase in the vicinity of 180° (example S(k2)).

For the symbol S(k1) having a phase Φ1, the square gives a phase of 2×Φ1.

For the symbol S(k2) having a phase Φ2=180+Φ2', the square gives a phase of 2×Φ2, in other words 2×(180+Φ2'), i.e. 2×Φ2', because of the "natural" elimination of the argument of the term 2×180°.

This phase $\hat{\theta}$, also denoted $e^{-j\hat{\theta}}$ in polar representation, represents the phase deviation between the frequency of the numerically controlled oscillator 2 of the receiver and the frequency of the emitter. If the mixing is coherent, i.e. the frequency of the numerically controlled oscillator 2 of the receiver is exactly the same as that of the emitter, this phase deviation is zero.

In practice, with a view to delivering a phase deviation allowing only the phase to be corrected, it is necessary for the modulus of the result to be 1, and therefore to normalize the sum of the squares; in addition, the argument of the result of the sum of the squares is divided by 2, in order to obtain the average phase deviation. This is advantageously obtained in practice using the square root operator (√) to divide the phase by 2.

It will be noted that the above method is less resource intensive computationally than an arctangent calculation, which would deliver the same result.

Next, the conjugate of the estimated phase deviation $e^{-j\hat{\theta}}$ is calculated.

$$e^{-j\hat{\theta}} = conj\left(\sqrt{\frac{\sum_{k=0}^{N-1}(S(k))^2}{\left\|\sum_{k=0}^{N-1}((Sk))^2\right\|}}\right) \qquad \text{Eq. 2}$$

In FIG. 3, the normalization of the sum of the squares and the calculation of the corresponding conjugate has been represented by the block referenced 51.

The conjugate $e^{-j\hat{\theta}}$ of the estimated phase deviation is injected into the phase equalizer 6, where it cancels out the phase deviation of the current symbol transmitted to the decoding block 8.

Therefore, the arguments of the current symbols transmitted to the decoding block 8 have values that are very close either to 0°, or to 180°.

The correction is thus made as illustrated in FIG. 5. An observed phase deviation is eliminated not just for symbols of low or zero phase, as illustrated, but also for symbols of phase close to 180°.

In certain practical cases, the phase drift may nevertheless prove to be greater, and the above phase equalization method may prove to be unsatisfactory, in particular when the phase deviations reach several tens of degrees and introduce a phase shift.

In particular, the drift in the estimations of the phase deviation $\hat{\theta}$ of several consecutive samples is then observed. To this end, each sample of the phase deviation $\hat{\theta}$ resulting from the calculation of equation Eq.1 may be identified by an index and therefore denoted $\hat{\theta}(i)$.

It is sought to calculate the drift in the phase deviations $\hat{\theta}(i)$ over the 2 most recent calculated values, for example on the basis of the following equation:

$$Drv\Phi = \hat{\theta}(i) - \hat{\theta}(i-1) \qquad \text{Eq. 3}$$

The above calculation is carried out in the block referenced 52 in FIG. 3.

In practice, since $e^{-j\hat{\theta}}$ is already known, DrvΦ, may be estimated in the following way:

$$e^{Drv\Phi} = e^{-j\hat{\theta}(i)} conj(e^{-j\hat{\theta}(i-1)}) \qquad \text{Eq. 4}$$

Advantageously, according to an aspect of the present invention, provision is made for a second correction that forms a feedback loop 62 and that acts on the numerically controlled oscillator 2 depending on the drift DrvΦ, in the deviations in phase of the baseband signal.

In the block 53, all that is required is to check the sign of the imaginary part of the complex vector $e^{Drv\Phi}$ in order to determine whether it is a question of a positive drift or a negative drift.

If a positive drift is observed, then an order to increase frequency is sent to the numerically controlled oscillator 2; in contrast, if a negative drift is observed, an order to decrease frequency is conversely sent to the numerically controlled oscillator 2.

The frequency increment or decrement sent to the numerically controlled oscillator 2 may be determined on the basis of a parameterizable gain of the correcting second feedback loop 62.

Advantageously, this second correction allows the frequency of the numerically controlled oscillator 2 to be reset to as close as possible to the received RDS subcarrier, and therefore the phase deviations to be returned to a range in which the equalization method works well.

Moreover, according to one aspect, the frequency of the numerically controlled oscillator 2 may also be corrected only if the drift DrvΦ in the phase deviations is higher than a preset threshold. In this case, it is necessary to evaluate the value of the drift DrvΦ of the deviations in phase on the basis of the complex vector $e^{Drv\Phi}$.

Figure 4:
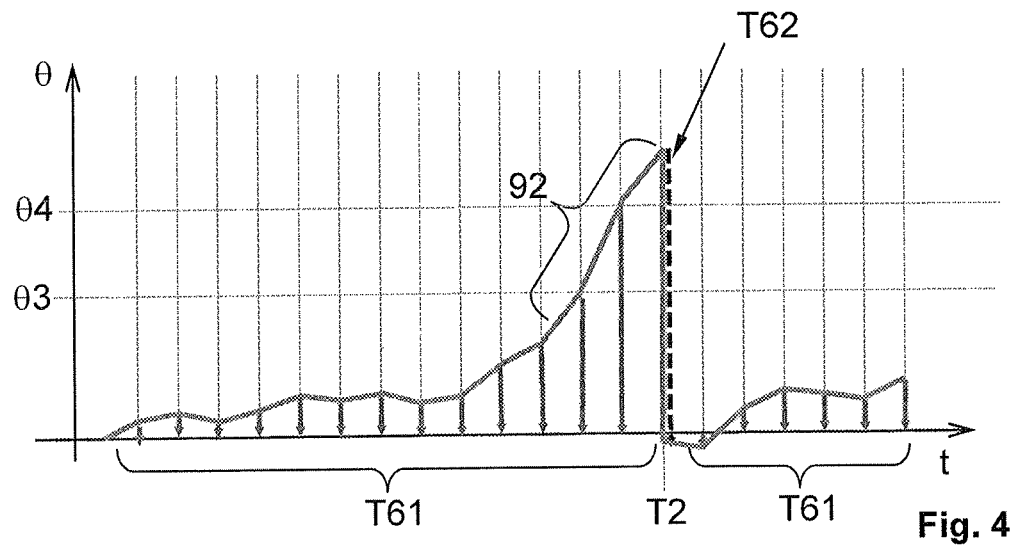
FIG. 4 illustrates a timing diagram of phase deviations.

This is illustrated in FIG. 4; significantly increasing phase deviations (θ3, θ4) may be seen. At the time referenced T2, the drift DrvΦ in the deviations in phase has exceeded the preset threshold (slope referenced 92), and the frequency of the numerically controlled oscillator 2 is incremented (reference T62 in FIG. 4), this having the immediate effect of shifting downward all the following phase deviations; the phase-equalization method (references T61 in FIG. 4) can then be implemented identically to how it was before the correction of the frequency of the numerically controlled oscillator 2.

In practice, the second correction just described above is observed to be invoked preponderantly when a new reception frequency has just been switched to (search for and stabilization on the 57 kHz subcarrier), then subsequently this second correction is invoked only episodically, most of the corrections being obtained by virtue of the phase equalizer, i.e. the first correction 61.

The invention claimed is:

1. A method for correcting RDS demodulation in a vehicle radio system, the method comprising:
    receiving, by an input for digital signals of a radio data system (RDS) demodulation block, RDS signals;
    mixing, by a complex digital mixer, the RDS signals with a complex value output by a numerically controlled oscillator to produce mixed RDS signals;
    filtering, by a low-pass filter, the mixed RDS signals to recover baseband demodulated RDS signals;
    estimating, by a phase-estimating block, a phase deviation of the baseband demodulated RDS signals based on a plurality of time delayed symbols in the baseband demodulated RDS signals;
    correcting, by an error loop filter, the complex value output by the numerically controlled oscillator depending on the estimation of the phase deviation of the baseband demodulated RDS signals; and
    decoding, by a decoding block, the baseband demodulated RDS signals.

2. The method as claimed in claim 1, wherein the phase-estimating block performs a calculation of the phase deviation on N last received symbols, N being an integer comprised between 4 and 16.

3. The method as claimed in claim 2, wherein the calculation of the phase deviation between a frequency of the numerically controlled oscillator and a frequency of an emitter is estimated using the following formula:

$$\hat{\theta} = \frac{1}{2}\arg\left(\sum_{k=0}^{N-1}(S(k))^2\right) = \frac{1}{2}\arctan\left(\sum_{k=0}^{N-1}(S(k))^2\right).$$

4. The method as claimed in claim 2, wherein a conjugate $e^{-j\hat{\theta}}$ of the estimated phase deviation is calculated, which is injected into a phase equalizer, where it cancels out the phase deviation of the symbol transmitted to the decoding block, the conjugate $e^{-j\hat{\theta}}$ of the phase deviation estimated being calculated using the following formula:

$$e^{-j\hat{\theta}} = conj\left(\frac{\sum_{k=0}^{N-1}(S(k))^2}{\sqrt{\left\|\sum_{k=0}^{N-1}((Sk))^2\right\|}}\right).$$

5. The method as claimed in claim 1, wherein the method comprises a second correction forming a feedback loop and acting on the numerically controlled oscillator depending on a drift in the phase deviations of the baseband signal, in order to reset a frequency of the numerically controlled oscillator to as close as possible to a received RDS subcarrier.

6. The method as claimed in claim 5, wherein the frequency of the numerically controlled oscillator is corrected only if the drift in the phase deviations is higher than a preset threshold.

7. The method as claimed in claim 5, wherein the drift in the phase deviations is calculated from an average drift over M consecutive phase deviations, M being an integer.

8. The method as claimed in claim 5, wherein the second correction forming the feedback loop is undersampled with respect to a first correction.

9. The method as claimed in claim 1, wherein the phase-estimating block performs a calculation of the phase deviation on N last received symbols, N being an integer equal to 8.

10. A vehicle radio system comprising:
    a digital core with an radio data system (RDS) demodulation block;
    an input for receiving digital signals, the input receiving RDS signals from the RDS demodulation block;
    a numerically controlled oscillator;
    a digital mixer that mixes the RDS signals with a complex value output by the numerically controlled oscillator to produce mixed RDS signals;
    a low-pass filter for filtering the mixed RDS signals to recover baseband demodulated RDS signals;
    a phase-estimating block for estimating a phase deviation of the baseband demodulated RDS signals based on a plurality of time delayed symbols in the baseband demodulated RDS signals;
    an error loop filter for correcting the complex value output by the numerically controlled oscillator depending on the estimation of the phase deviation of the baseband demodulated RDS signals; and
    a decoding block for decoding the baseband demodulated RDS signals.

11. The vehicle radio system as claimed in claim 10, furthermore comprising a second correction forming a feedback loop and acting on the numerically controlled oscillator depending on a drift in the phase deviations of the baseband signal, in order to reset a frequency of the numerically controlled oscillator to as close as possible to a received RDS subcarrier.

* * * * *